United States Patent Office 3,146,561
Patented Sept. 1, 1964

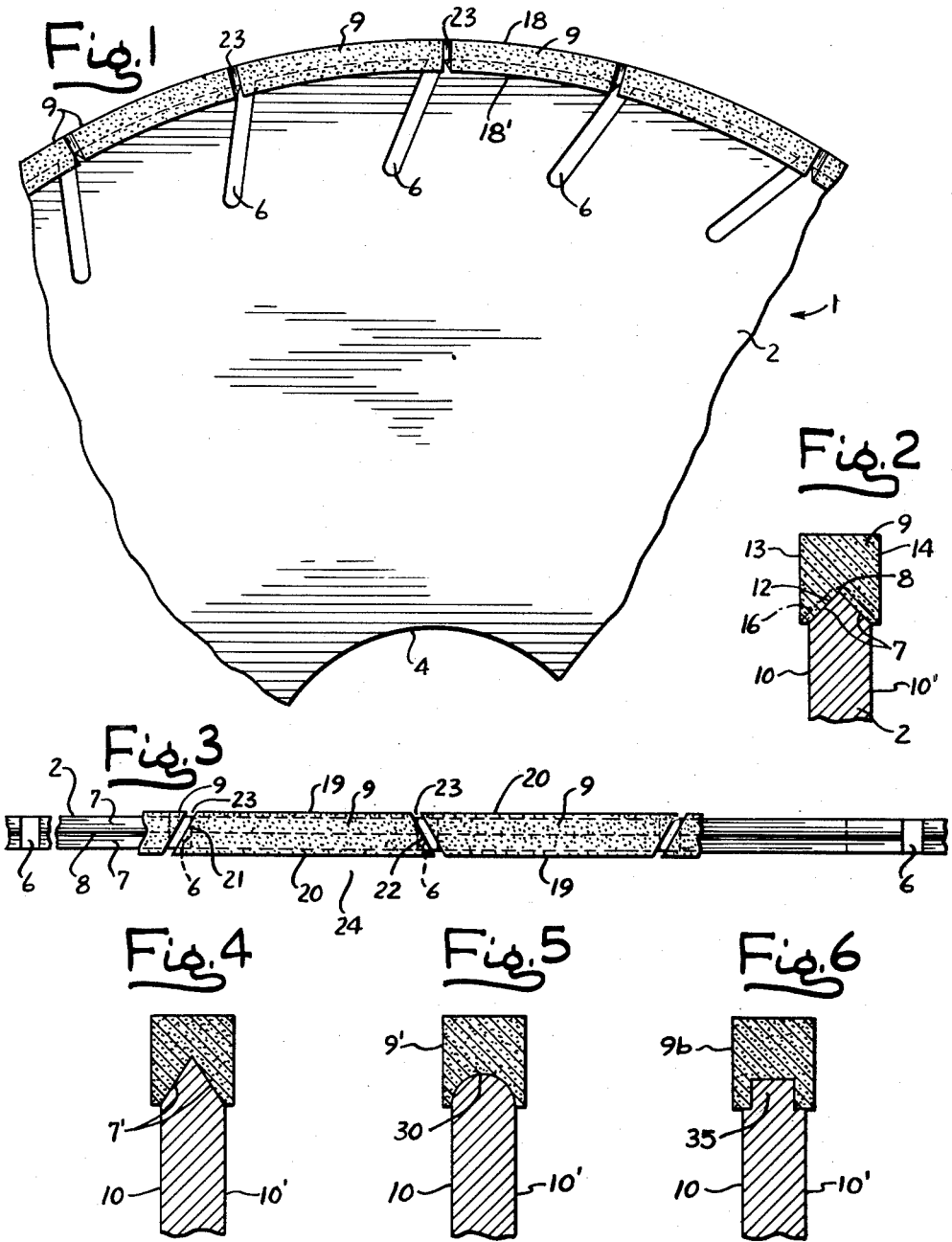

3,146,561
CIRCULAR SAW AND METHOD OF MAKING
THE SAME
Frederick W. Lindblad, 835 Illinois Ave., Aurora, Ill.
Filed May 1, 1961, Ser. No. 106,789
12 Claims. (Cl. 51—206.4)

This invention relates to circular saws of the kind used for sawing hard material such as concrete, granite or the like, and to a method of making such saws.

Saws of the kind with which the present invention is concerned, generally consist of a disk such as for instance a steel disk which is hardened and tensioned and to the periphery of which there are brazed pre-formed segments. These segments include the cutting material which may consist of diamond particles embedded in a suitable metal.

It is one of the objects of the present invention to provide a core blank and segments, which are so shaped at their respective places of contact with one another as to reduce as much as possible the forces tending to shear the segments off of the core blank. It is a further object of the present invention to provide a saw of the above-mentioned character wherein the area of contact between the segment and the core may be increased in order to get a stronger bond between the two.

It is a still further object of the present invention to provide a saw core and segment of such relative shapes that centering and aligning of the segment with respect to the core becomes substantially automatic.

It is a still further object of the present invention to provide segments and cores of such relative contacting shapes that the hardened segments and the tensioned saw blank can be assembled without the application of appreciable heat, less than the annealing-temperature of the blank on the segment, thereby eliminating the danger of heat distortion.

It is a still further object of the present invention to provide a contacting shape between a cutting segment and the core blank such that upon wear of the segment as a result of use of the saw, the segment will tend to approach a shape of the core end, thereby permitting more complete utilization of the segment as the same becomes worn with use.

It is another object of the present invention to provide an economical method of making a saw having the foregoing characteristics.

The attainment of the above and further objects of the present invention will be apparent from the following specification taken in conjunction with the accompanying drawing forming a part thereof.

In the drawing:

FIG. 1 is a front view of a saw blade constructed in accordance with the present invention;

FIG. 2 is an enlarged fragmentary sectional view taken transversely through the end of the saw;

FIG. 3 is a fragmentary developed view of the cutting surface of the blade drawn to an enlarged scale;

FIGS. 4, 5, and 6 are views similar to FIG. 2, each showing a modified construction.

Reference may now be had more particularly to the drawing wherein like reference numerals designate like parts throughout.

A saw 1 comprises a core blank 2 which may consist of a hardened and tensioned steel disk as is conventional in the art, said disk including a central opening 4 or other conventional means for mounting the disk on an arbor of a motor power driven saw actuating mechanism. At its outer periphery the saw has a series of slots 6 for cooling and swarf clearance. In this instance there are twenty-four such slots uniformly spaced around the perimeter of the core blank 2. This much of the blank 2 is of a shape and construction conventional in the art.

At its outer periphery the core blank 2 is tapered as indicated at 7 to a point 8 which forms an annular ridge centered between the faces 10' and 10 of the blank 2. Twenty-four identical cutting segments 9 are assembled around the edge of the core blank 2. Each one of the segments 9 is a diamond cutting segment of compositions known in the art and includes diamond abrasive particles embedded in a suitable matrix, which may be cast metal or pressed or sintered metal, or powdered metal, or ceramic material or molded plastic. In the case of a segment wherein the matrix is metal, the segment is suitably pre-hardened. The bottom surface of the segment 9 has an arcuate groove therein which is of a shape of the counterpart of the surfaces 7—7 at the rim of the core blank and each segment is secured to the core blank by an adhering film of silver solder or any epoxy resin. Also in such a saw the blank 2 may be made of strong fibrous material such as laminated fibre glass, or of epoxy sheets. The V-shaped groove 12 at the bottom of the segment 9 is centered between the side faces 13 and 14 thereof (which are in planes parallel to the planes 10 and 10') constituting the opposite sides of the core blank 2. During use, as the segment wears, it tends to wear down to a shape such as is indicated at 16 which is a shape closely approximating the edges 7—7.

It is to be noted that the surfaces 7—7 of the core blank provide a greater area of contact between the edge of the core blank and the diamond cutting segment 9. This area may be substantially increased by making the edges 7—7 at a more acute angle to one another as indicated at 7'—7' of FIGURE 4.

Each of the segments 9 is arcuate at its outer edge 18 and its inner edge 18', being curved along a circle whose center is the center of the core blank 2. In addition, each segment has a short face 19 and a long face 20 joined by inclined edges 21 and 22. The segments are assembled so that the short edges 19 of alternating segments are on the same side (10 or 10') of the blade and separated by the long sides 20 of the intervening alternate segments. The segments are designed as is sometimes preferable and is herein illustrated, so as to leave a short swarf clearance space 23 between successive segments, each of the clearance spaces 23 intersecting the slots 6 in the core blank. The spaces 23 between successive segments are at opposite angles with respect to the direction of rotation of the saw blade. This tends to maintain the blade centered in the slot that it is sawing in the cement or granite, and it tends to prevent skewing of the blade.

When the segments are secured to the blade core by a film of epoxy resin, it is not necessary to apply to the core blank or to the hardened segments, as part of the step of securing them together, heat in any amount above the annealing temperatures of the components. This eliminates the risk of heat distortion during assembly of the saw. It is further to be noted that any forces encountered during the use of the saw which are exerted in a direction axially of the saw or in a direction having a substantial component axially of the saw, tends to shear the segment from the core blank. Because of the fact that the blank projects into the segment, the blank resists these shearing forces.

In FIGURE 5 there has been shown a modification wherein the edge of the saw blade is rounded as indicated at 30, and the bottom arcuate surface of the segment 9' is similarly mounted. This segment and the core blank also are secured together by an interposed film of epoxy resin. The curved surface 30 tends to relieve the epoxy resin of most, if not all, of the stress incident to axial force applied to the segment 9' of the saw during the sawing operation and it also increases the area of contact between the core blank and the segment 9'.

In FIGURE 6 there is shown a section wherein the end of the core blank has a reduced width rectangular tongue 35 centered with respect to the surfaces 10' and 10 of the core blank and extending arcuately along the rim of the blank to successive slots 6. At 9b there is shown a segment that corresponds to the segment 9 of FIGURE 2 and which has a similar shaped slot for receiving the tongue 35.

In compliance with the requirements of the patent statutes, there has here been shown a few preferred embodiments of the present invention. What is considered new and sought to be secured by Letters Patent is:

1. A saw comprising a circular blank the peripheral edge of which is of a reduced thickness, and a cutting edge comprising arcuate segments that include diamond abrasive particles embedded in a matrix, said segments surrounding the periphery of the blank and each having a notch which is a counterpart of and fits over the edge of the blank with an interposed adhering film, the counterpart surfaces being of a shape to align the segments on the disc blank and center them between opposite sides of the disc blank, each segment being of an axial thickness greater than that of the blank adjacent to but spaced from the reduced perimeter thereof.

2. A saw comprising a circular blank the peripheral edge of which is V-shaped in cross section with the apex of the V pointing radially outwardly of the blank, and a cutting edge comprising arcuate segments that include diamond abrasive particles embedded in a matrix, said segments surrounding the periphery of the blank and each having a V-shaped notch which is a counterpart of and fits over the V-shaped edge of the blank and is secured thereto by an interposed adhering bonding film, each segment being of an axial thickness at least that of the blank at the perimeter thereof, each of the segments being symmetrically tapered to be of greater arcuate extent on one axial side of the blank than on the other and assembled with alternate segments having their longer arcuate extent on one face of the saw and the intervening alternate segments have their longer arcuate extent on the other face of the saw.

3. A saw comprising a hardened and tensioned circular metal blank the peripheral edge of which is V-shaped in cross section with the apex of the V pointing radially outwardly of the blank, and a cutting edge comprising hardened arcuate segments that include diamond abrasive particles embedded in a matrix, said segments surrounding the periphery of the blank and each having a V-shaped notch which is a counterpart of and fits over the V-shaped edge of the blank and is secured thereto by an interposed adhering bonding film, each segment being of an axial thickness at least that of the blank at the perimeter thereof, each of the segments being symmetrically tapered to be of greater arcuate extent on one axial side of the blank than on the other and assembled with alternate segments having their longer arcuate extent on one face of the saw and the intervening alternate segments have their longer arcuate extent on the other face of the saw.

4. A saw comprising a circular blank the peripheral edge of which is V-shaped in cross section with the apex of the V pointing radially outwardly of the blank and centered axially thereof, and a cutting edge comprising arcuate segments that include diamond abrasive particles embedded in a matrix, said segments surrounding the periphery of the blank and each having a V-shaped notch which is a counterpart of and fits over the V-shaped edge of the blank with an interposed adhering film, each segment being of an axial thickness at least that of the blank at the perimeter thereof, each of the segments being symmetrically tapered to be of greater arcuate extent on one axial side of the blank than on the other and assembled with alternate segments having their longer arcuate extent on one face of the saw and the intervening alternate segments have their longer arcuate extent on the other face of the saw.

5. A saw as defined in claim 4 wherein adjacent segments are spaced apart for swarf clearance.

6. A method of making a saw, which comprises providing a hardened and tensioned circular blank the peripheral edge of which is V-shaped in cross section with the apex of the V pointing radially outwardly of the blank and centered axially thereof, providing hardened arcuate cutting segments that include diamond abrasive particles embedded in a matrix and each having a V-shaped notch which is a counterpart of the V-shaped edge of the blank, placing the segments around the blank with the apex of the blank entering the V notches in the segments and adhering them to the blank by an interposed adhering film all at substantially below the annealing temperature of the components used to avoid changing the hardness and the temper of the parts being joined.

7. A saw as defined in claim 1 wherein the adhering film is an epoxy resin.

8. A saw as defined in claim 1 wherein the matrix is substantially metal.

9. A saw as defined in claim 1 wherein the matrix is a ceramic.

10. A saw as defined in claim 1, wherein the matrix is molded plastic.

11. A saw as defined in claim 1 wherein the blank is a laminated fibrous blank.

12. A method of making a saw, which method comprises providing a hardened and tensioned circular blank disc the peripheral portion of which is narrower than the radially inwardly adjacent part of the blank, providing hardened arcuate cutting segments that include diamond abrasive particles embedded in a matrix and each having a notch which is a counterpart of the peripheral portion of the blank, placing the segments around the blank in positions bi-sected by the central plane of the blank disc and with the peripheral portion of the blank entering the notches in the segments and adhering them to the blank by an interposed adhering film all at substantially below the annealing temperature of the components used, to avoid changing the hardness and temper of the parts being joined.

References Cited in the file of this patent

UNITED STATES PATENTS

| | | |
|---|---|---|
| 2,015,727 | Prey | Oct. 1, 1935 |
| 2,094,556 | Anderson | Sept. 28, 1937 |
| 2,286,361 | Goddu | June 16, 1942 |
| 2,557,047 | Goepfert et al. | June 12, 1951 |
| 2,822,648 | Metzger | Feb. 11, 1958 |
| 2,875,559 | Garrison | Mar. 3, 1959 |
| 2,913,858 | Praeg et al. | Nov. 24, 1959 |